(12) United States Patent
Matsutani

(10) Patent No.: US 11,151,715 B2
(45) Date of Patent: Oct. 19, 2021

(54) DYNAMIC ANALYSIS SYSTEM

(71) Applicant: Konica Minolta, Inc., Tokyo (JP)

(72) Inventor: Noritsugu Matsutani, Musashino (JP)

(73) Assignee: Konica Minolta, Inc., Tokyo (JP)

( * ) Notice: Subject to any disclaimer, the term of this patent is extended or adjusted under 35 U.S.C. 154(b) by 64 days.

(21) Appl. No.: 15/977,062

(22) Filed: May 11, 2018

(65) Prior Publication Data

US 2018/0342056 A1    Nov. 29, 2018

(30) Foreign Application Priority Data

May 25, 2017 (JP) .............................. JP2017-103298

(51) Int. Cl.
*G06T 7/13* (2017.01)
*G06T 7/00* (2017.01)
*G06T 5/00* (2006.01)
*G06T 7/12* (2017.01)

(52) U.S. Cl.
CPC ............ *G06T 7/0012* (2013.01); *G06T 5/002* (2013.01); *G06T 7/12* (2017.01); *G06T 7/13* (2017.01); *G06T 2207/10116* (2013.01); *G06T 2207/30061* (2013.01)

(58) Field of Classification Search
CPC ......... G06T 7/0012; G06T 7/12; G06T 5/002; G06T 7/13; G06T 2207/10116; G06T 2207/30061
See application file for complete search history.

(56) References Cited

U.S. PATENT DOCUMENTS

2004/0213377 A1* 10/2004 Endo .................. A61B 6/482
378/98.11
2015/0065817 A1* 3/2015 Noji ................... A61B 6/5264
600/301

FOREIGN PATENT DOCUMENTS

| JP | 2001-212118 A | 8/2001 |
| JP | 2006275820 | 10/2006 |
| JP | 2006-346465 A | 12/2006 |
| JP | 2015-029811 A | 2/2015 |
| JP | 2015-043880 A | 3/2015 |
| WO | WO201152064 | 12/2011 |
| WO | WO 2014/091977 A1 | 6/2014 |
| WO | WO 2014/185197 A1 | 11/2014 |

* cited by examiner

*Primary Examiner* — Chuong A Ngo

(74) *Attorney, Agent, or Firm* — BakerHostetler

(57) ABSTRACT

A dynamic analysis system includes: a hardware processor that: extracts an extended lung field region formed of one region including two lungs and a region between the two lungs from a dynamic image obtained by radiography of a dynamic state of a chest of a subject; and generates an analysis result image illustrating an analysis result of a pulmonary function in the extended lung field region by analyzing the dynamic image.

25 Claims, 5 Drawing Sheets

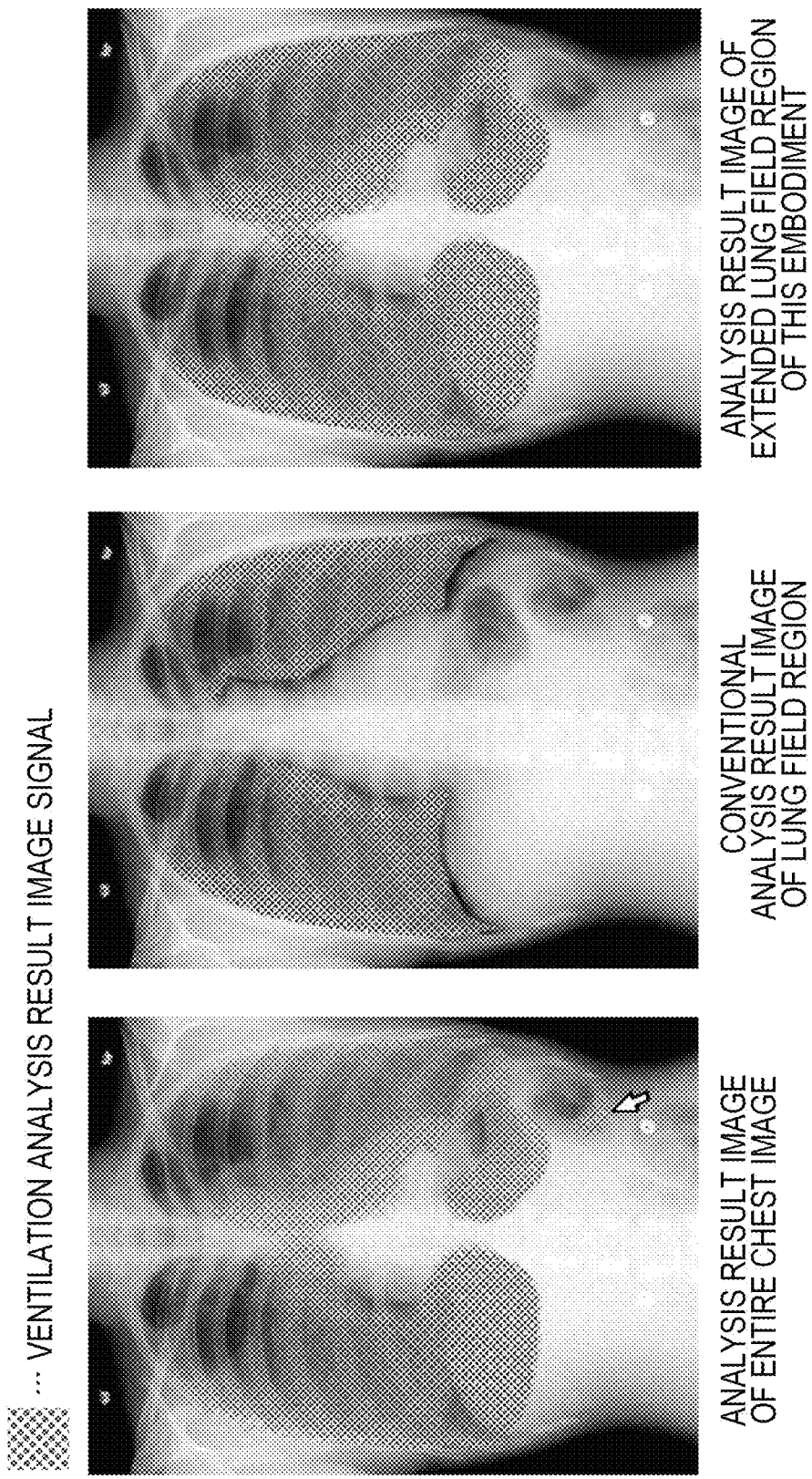

DYNAMIC ANALYSIS SYSTEM

The entire disclosure of Japanese patent Application No. 2017-103298, filed on May 25, 2017, is incorporated herein by reference in its entirety.

BACKGROUND

Technological Field

The present invention relates to a dynamic analysis system.

Description of the Related Art

Conventionally, a technology of extracting a lung field region from a chest radiographic image is known. For example, Japanese Patent No. 2014-236842 discloses a technology of extracting a region in which a pixel value is equal to or larger than a threshold from the chest radiographic image and extracting a region in which a region width is the largest as the lung field region from the extracted region (refer to, for example. Japanese Patent No. 2014-236842).

In the technology disclosed in Japanese Patent No. 2014-236842, as illustrated in FIG. 6 of Japanese Patent No. 2014-236842, right and left two lungs are extracted as lung field regions and a part where a thoracic vertebra exists and a cardiac region located between the two lungs are excluded. However, in a chest of a human body, the two lungs repeatedly expand and contract so as to fill an entire area including the two lungs, so that when considering a three-dimensional structure, the lung exists in reality in front of the thoracic vertebra, at the back of the heart, and at the back of a diaphragm although this is not visible in a two-dimensional radiographic image. Therefore, for example, when displaying an analysis result image illustrating a pulmonary function by analyzing a dynamic image obtained by radiography of a dynamic state of the chest, and when calculating quantitative information of a ventilation function such as a vital capacity and FEV1.0% and quantitative information of a blood flow function such as a volume of infusion, if the lung field region extracted by the technology disclosed in Japanese Patent No. 2014-236842 is made a processing target, there is a problem that the front of the thoracic vertebra, the back of the heart, the back of the diaphragm and the like are eliminated and correct pulmonary function information cannot be obtained. On the other hand, when analyzing the entire image, noise other than the lung is included, which is not preferable.

SUMMARY

An object of the present invention is to obtain pulmonary function information with a high degree of accuracy from a dynamic image of a chest.

To achieve the abovementioned object, according to an aspect of the present invention, a dynamic analysis system reflecting one aspect of the present invention comprises a hardware processor that:

extracts an extended lung field region formed of one region including two lungs and a region between the two lungs from a dynamic image obtained by radiography of a dynamic state of a chest of a subject; and generates an analysis result image illustrating an analysis result of a pulmonary function in the extended lung field region by analyzing the dynamic image.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 6 is a view illustrating an analysis result image of an entire image, an analysis result image of a lung field region extracted by a conventional technology, and an analysis result image of an extended lung field region in this embodiment.

DETAILED DESCRIPTION OF EMBODIMENTS

Hereinafter, one or more embodiments of the present invention will be described with reference to the drawings. However, the scope of the invention is not limited to the disclosed embodiments.

[Configuration of Dynamic Analysis System 100]

First, a configuration of this embodiment is described.

Figure 1:
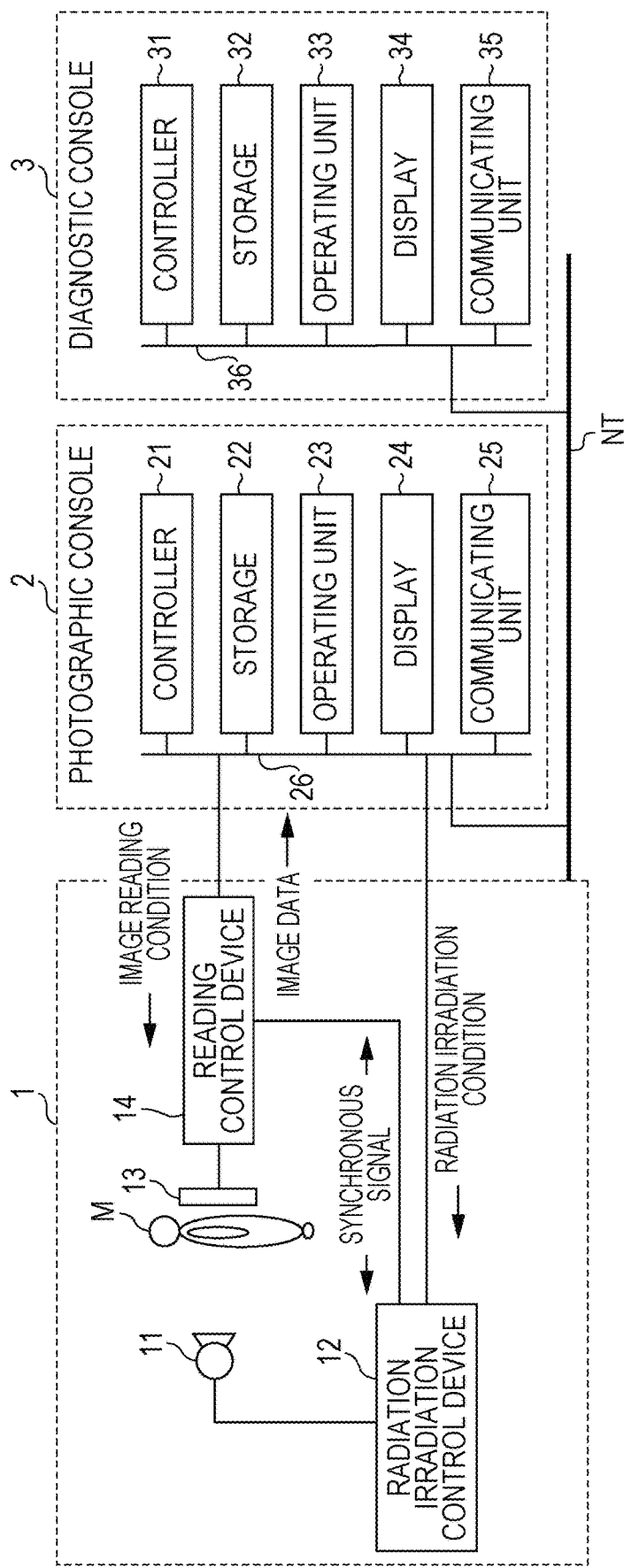
FIG. 1 is a view illustrating an overall configuration of a dynamic analysis system in an embodiment of the present invention.

FIG. 1 illustrates an overall configuration of a dynamic analysis system 100 in this embodiment.

As illustrated in FIG. 1, the dynamic analysis system 100 is configured such that a photographing device 1 and a photographic console 2 are connected to each other through a communication cable and the like, and the photographic console 2 and a diagnostic console 3 are connected to each other through a communication network NT such as a local area network (LAN). Each device forming the dynamic analysis system 100 meets digital image and communications in medicine (DICOM) standards and communication among the devices is performed in conformity with the DICOM.

[Configuration of Photographing Device 1]

The photographing device 1 is a photographing unit that photographs a dynamic state of a living body such as morphological change such as expansion and contraction of a lung in accordance with respiratory motion and heartbeat, for example. Kymography is intended to mean obtaining a plurality of images illustrating a dynamic state of a subject by repeatedly irradiating the subject with radiation such as X-rays in a pulsed manner at a predetermined time interval (pulse irradiation), or continuously irradiating the same at a low dose rate without interruption (continuous irradiation). A series of images obtained by the kymography is referred to as a dynamic image. Each of a plurality of images forming the dynamic image is referred to as a frame image. Meanwhile, in the following embodiment, a case of performing the kymography of a chest by the pulse irradiation is described as an example.

A radiation source 11 arranged in a position opposed to a radiation detecting unit 13 across a subject M (subject)

irradiates the subject M with the radiation (X-rays) under the control of a radiation irradiation control device 12.

The radiation irradiation control device 12 connected to the photographic console 2 controls the radiation source 11 on the basis of a radiation irradiation condition input from the photographic console 2 to perform radiography. The radiation irradiation condition input from the photographic console 2 includes a pulse rate, a pulse width, a pulse interval, the number of frames taken by single photography, a value of X-ray tube current, a value of X-ray tube voltage, an additive filter type and the like, for example. The pulse rate is the number of times of radiation irradiation per second and this conforms to a frame rate to be described later. The pulse width is radiation irradiation time per single radiation irradiation. The pulse interval is time from the start of one radiation irradiation to the start of next radiation irradiation and this conforms to a frame interval to be described later.

The radiation detecting unit 13 is formed of a semiconductor image sensor such as a flat panel detector (FPD). The FPD includes a glass substrate and the like, for example, and a plurality of detecting elements (pixels) which detects the radiation emitted from the radiation source 11 to be transmitted through at least the subject M according to its intensity and converts the detected radiation to an electric signal to accumulate is arranged in a matrix pattern in a predetermined position on the substrate. Each pixel includes a switching unit such as a thin film transistor (TFT), for example. The FPD includes an indirect conversion type that converts X-rays into an electric signal by a photoelectric conversion element via a scintillator and a direct conversion type that directly converts X-rays into an electric signal, and any of them may be used.

The radiation detecting unit 13 is provided so as to be opposed to the radiation source 11 across the subject M.

A reading control device 14 is connected to the photographic console 2. The reading control device 14 controls the switching unit of each pixel of the radiation detecting unit 13 on the basis of an image reading condition input from the photographic console 2 to switch reading of the electric signal accumulated in each pixel and reads the electric signals accumulated in the radiation detecting unit 13 to obtain image data. The image data is the frame image. Then, the reading control device 14 outputs the obtained frame image to the photographic console 2. The image reading condition includes the frame rate, the frame interval, a pixel size, an image size (matrix size) and the like, for example. The frame rate is the number of frame images obtained per second and this conforms to the pulse rate. The frame interval is time from the start of one obtaining operation of the frame image to the start of next obtaining operation of the frame image and this conforms to the pulse interval.

Herein, the radiation irradiation control device 12 and the reading control device 14 are connected to each other and communicate synchronous signals to each other to synchronize radiation irradiation operation with image reading operation.

[Configuration of Photographic Console 2]

The photographic console 2 outputs the radiation irradiation condition and the image reading condition to the photographing device 1 to control operation of the radiography and radiation image reading by the photographing device 1 and displays the dynamic image obtained by the photographing device 1 for confirming positioning and confirming whether this is the image suitable for diagnosis by photographer such as a photographic engineer.

The photographic console 2 is provided with a controller 21, a storage 22, an operating unit 23, a display 24, and a communicating unit 25 connected to one another by a bus 26 as illustrated in FIG. 1.

The controller 21 is formed of a central processing unit (CPU), a random access memory (RAM) and the like. The CPU of the controller 21 reads a system program and various processing programs stored in the storage 22 to develop in the RAM and executes various pieces of processing such as photographing control processing to be described later according to the developed programs, thereby performing concentrated control of operation of each unit of the photographic console 2 and the radiation irradiation operation and the reading operation of the photographing device 1 in response to operation of the operating unit 23.

The storage 22 is formed of a non-volatile semiconductor memory, a hard disk and the like. The storage 22 stores various programs executed by the controller 21, parameters required for executing the processing by the programs, or data such as a processing result. For example, the storage 22 stores the program for executing the photographing control processing illustrated in FIG. 2. The storage 22 also stores the radiation irradiation condition and the image reading condition in association with a site to be examined (herein, the chest). The various programs are stored in a mode of a readable program code and the controller 21 sequentially executes operation according to the program code.

The operating unit 23 is provided with a keyboard including a cursor key, a number input key, various function keys and the like and a pointing device such as a mouse and outputs an instruction signal input by key operation on the keyboard and mouse operation to the controller 21. The operating unit 23 may also be provided with a touch panel on a display screen of the display 24; in this case, this outputs the instruction signal input through the touch panel to the controller 21.

The display 24 formed of a monitor such as a liquid crystal display (LCD) and a cathode ray tube (CRT) displays an input instruction from the operating unit 23, the data and the like in response to an instruction of a display signal input from the controller 21.

The communicating unit 25 provided with a LAN adapter, a modem, a terminal adapter (TA) and the like controls data transmission/reception to/from each device connected to the communication network NT.

[Configuration of Diagnostic Console 3]

The diagnostic console 3 is a dynamic analysis device which obtains the dynamic image from the photographic console 2, analyzes the obtained dynamic image, and displays an analysis result.

The diagnostic console 3 is provided with a controller 31, a storage 32, an operating unit 33, a display 34, and a communicating unit 35 connected to one another through a bus 36 as illustrated in FIG. 1.

The controller 31 is formed of a CPU, a RAM and the like. The CPU of the controller 31 reads a system program and various processing programs stored in the storage 32 to develop in the RAM and executes various pieces of processing such as dynamic analysis processing according to the developed programs, thereby performing concentrated control of operation of each unit of the diagnostic console 3 in response to operation of the operating unit 33. The controller 31 serves as an extended lung field region extractor, a generator, and a calculator.

The storage 32 is formed of a non-volatile semiconductor memory, a hard disk and the like. The storage 32 stores various programs such as a program for executing the dynamic analysis processing by the controller 31, parameters required for executing the processing by the programs, or data such as a processing result. The various programs are stored in a mode of a readable program code and the controller 31 sequentially executes the operation according to the program code.

In addition, the storage 32 stores the dynamic image taken in the past in association with patient information (for example, ID, name, body height, body weight, age, sex and the like of patient), examination information (for example, examination ID, examination date, site to be examined (in this case, the chest) and the like).

The operating unit 33 is provided with a keyboard including a cursor key, a number input key, various function keys and the like and a pointing device such as a mouse and outputs an instruction signal input by key operation on the keyboard and mouse operation by a user to the controller 31. The operating unit 33 may also be provided with a touch panel on a display screen of the display 34; in this case, this outputs the instruction signal input through the touch panel to the controller 31.

The display 34 formed of a monitor such as an LCD and a CRT performs various displays according to an instruction of a display signal input from the controller 31.

The communicating unit 35 provided with a LAN adaptor, a modem, a TA and the like controls data transmission/reception to/from each device connected to the communication network NT.

[Operation of Dynamic Analysis System 100]

Next, operation of the dynamic analysis system 100 in this embodiment is described.

(Operation of Photographing Device 1 and Photographic Console 2)

Photographing operation by the photographing device 1 and the photographic console 2 is first described.

Figure 2:
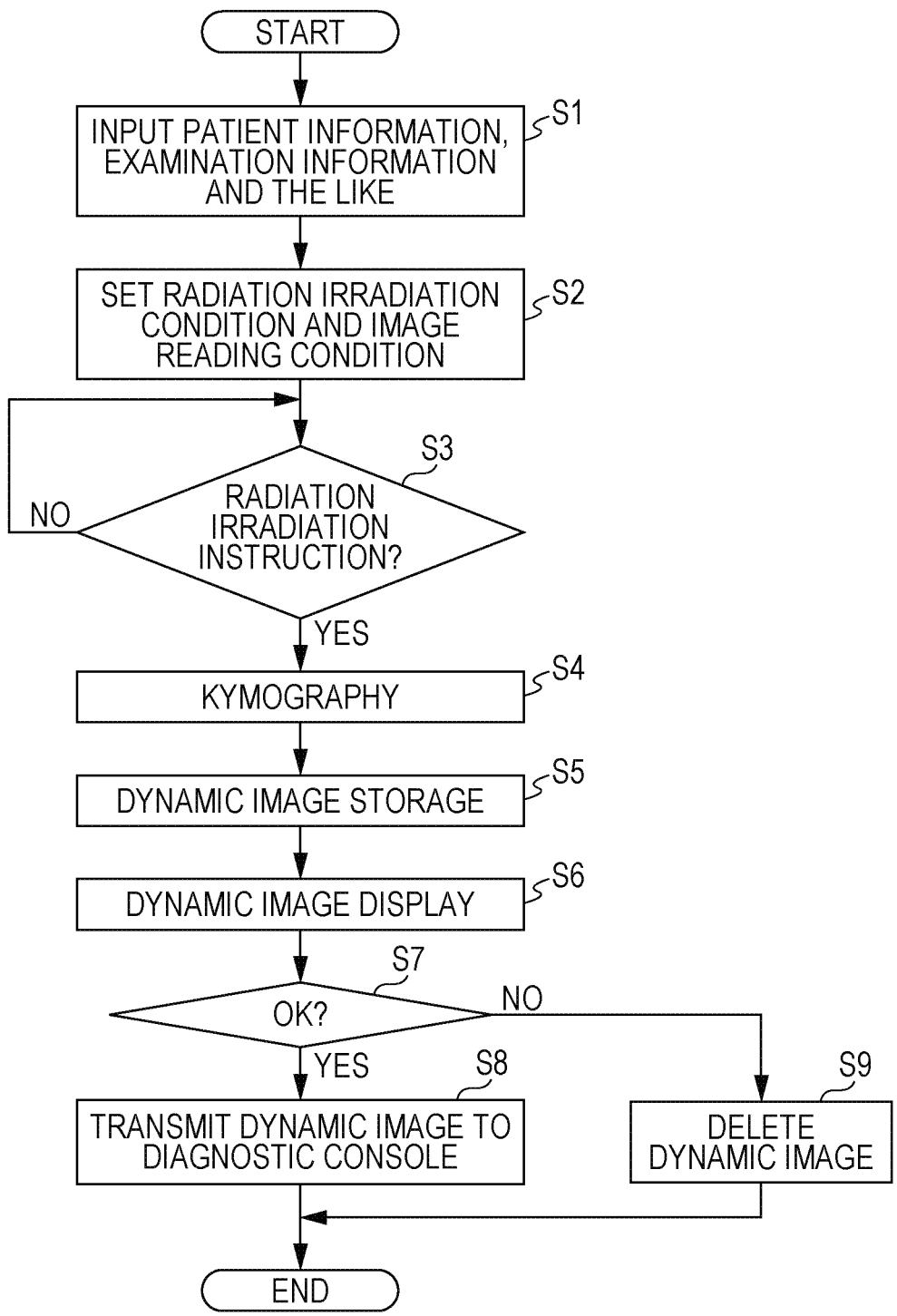
FIG. 2 is a flowchart illustrating a photographing control processing executed by a controller of a photographic console in FIG. 1.

FIG. 2 illustrates the photographing control processing executed by the controller 21 of the photographic console 2. The photographing control processing is executed by cooperation of the controller 21 and the program stored in the storage 22.

First, the operating unit 23 of the photographic console 2 is operated by the photographer and the patient information and the examination information of the subject (subject M) are input (step S1).

Next, the radiation irradiation condition is read from the storage 22 to be set in the radiation irradiation control device 12 and the image reading condition is read from the storage 22 to be set in the reading control device 14 (step S2).

Next, an instruction of the radiation irradiation by the operation of the operating unit 23 is waited (step S3). Herein, the photographer arranges the subject M between the radiation source 11 and the radiation detecting unit 13 and performs positioning. Also, the subject (subject M) is instructed on a respiratory status (deep respiration, quiet respiration, respiration stop and the like). When photographing preparations are completed, the operating unit 23 is operated to input the radiation irradiation instruction.

When the radiation irradiation instruction is input by the operating unit 23 (step S3; YES), a photographing start instruction is output to the radiation irradiation control device 12 and the reading control device 14, and kymography is started (step S4). That is, the radiation source 11 emits the radiation at the pulse interval set in the radiation irradiation control device 12 and the frame images are obtained by the radiation detecting unit 13.

When photographing of a predetermined number of frames is completed, the controller 21 outputs an instruction to finish photographing to the radiation irradiation control device 12 and the reading control device 14 and the photographing operation is stopped. The number of taken frames is the number of images with which at least one respiration cycle may be photographed.

The frame images obtained by photographing are sequentially input to the photographic console 2 to be stored in the storage 22 in association with the numbers indicating the order of photographing (frame numbers) (step S5) and displayed on the display 24 (step S6). The photographer confirms the positioning and the like by the displayed dynamic image to determine whether the image suitable for the diagnosis is obtained by the photographing (photographing OK) or retake is required (photographing no good). Then, the operating unit 23 is operated to input a determination result.

When the determination result indicating that the photographing is OK is input by predetermined operation of the operating unit 23 (step S7; YES), information such as an identification ID for identifying the dynamic image, the patient information, the examination information, the radiation irradiation condition, the image reading condition, the number indicating the order of photographing (frame number) and the like is added to each of a series of frame images obtained by the kymography (for example, written in a header of the image data in a DICOM format) to be transmitted to the diagnostic console 3 through the communicating unit 25 (step S8). Then, this procedure is finished. On the other hand, when the determination result indicating that the photographing is no good is input by predetermined operation of the operating unit 23 (step S7; NO), a series of frame images stored in the storage 22 is deleted (step S9) and this procedure is finished. In tins case, retake is required.

(Operation of Diagnostic Console 3)

Next, operation of the diagnostic console 3 is described.

Figure 3:
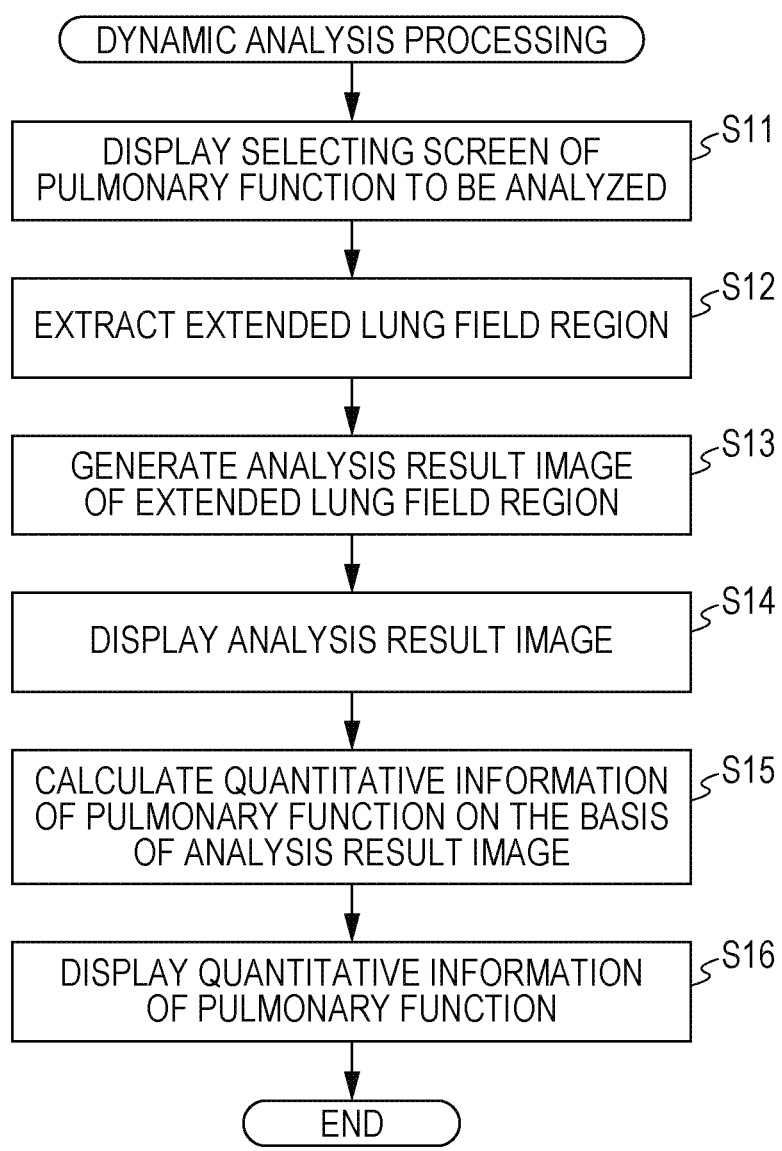
FIG. 3 is a flowchart illustrating a dynamic analysis processing executed by a controller of a diagnostic console in FIG. 1.

In the diagnostic console 3, when a series of frame images of the dynamic image is received from the photographic console 2 through the communicating unit 35, the received series of frame images of the dynamic image is stored in the storage 32. Also, when one dynamic image is selected from the dynamic images stored in the storage 32 by the operating unit 33 and execution of the dynamic analysis processing is instructed, the controller 31 and the program stored in the storage 32 cooperate to execute the dynamic analysis processing illustrated in FIG. 3. Hereinafter, the dynamic analysis processing is described with reference to FIG. 3.

First, a selecting screen of a pulmonary function to be analyzed is displayed on the display 34 (step S11).

On the selecting screen, for example, either ventilation or a blood flow may be selected by the operating unit 33 as the pulmonary function to be analyzed.

Next, an extended lung field region is extracted from the dynamic image (step S12).

Herein, in the conventional lung field region extraction technology (refer to, for example, Japanese Patent No. 2014-236842), a region formed of right and left two lungs visible in a chest radiographic image was extracted as the lung field region. However, in reality, the lung also exists in a region between the two lungs in front of a thoracic vertebra and at the back of the heart, and at the back of a diaphragm. Therefore, in this embodiment, a region formed of one region including the two lungs and the lung region hidden behind other structures and is not visible (at least the region between the two lungs) is extracted as the extended lung field region.

The extended lung field region may be extracted in one frame image of the dynamic image or may be extracted for each frame image of the dynamic image. By extracting the extended lung field region only in one frame image of the dynamic image, the extended lung field region is extracted only once, so that a processing load may be suppressed. Also, for example, if the frame image of a maximum inspiratory level is selected as the frame image for extracting the extended lung field region, the largest extended lung field region may be obtained, so that it is possible to suppress a region where the lung field exists in other frame images from protruding from the extended lung field region. Also, since the extended lung field region is optimized for each frame image by extracting the extended lung field region for each frame image of the dynamic image, accurate pulmonary function information (for example, an analysis result image or quantitative information to be described later) may be obtained.

An extracting method of the extended lung field region may include, for example, following (1) or (2).

(1) First, contours of regions of the two lungs (right and left lungs) are extracted from the frame image to be processed in the dynamic image.

In the regions of the two lungs, a pixel signal value is higher than that in a peripheral region in each frame image of the dynamic image because of a large transmission amount of the radiation (X-rays). Therefore, the contours of the regions of the two lungs may be extracted by following processing. First, a density histogram is created from the pixel signal value of each pixel, and a threshold is obtained by a discrimination analysis method and the like. Next, a region of a higher signal than the obtained threshold is extracted as a candidate for the regions of the two lungs. Next, edge detection is performed in the vicinity of a boundary of the candidate region, and points at which the edge becomes maximum in a small region in the vicinity of the boundary are extracted along the boundary. Then, the extracted edge point is approximated with a polynomial function, thereby obtaining boundary lines (contours) of the regions of the two lungs.

Figure 4:
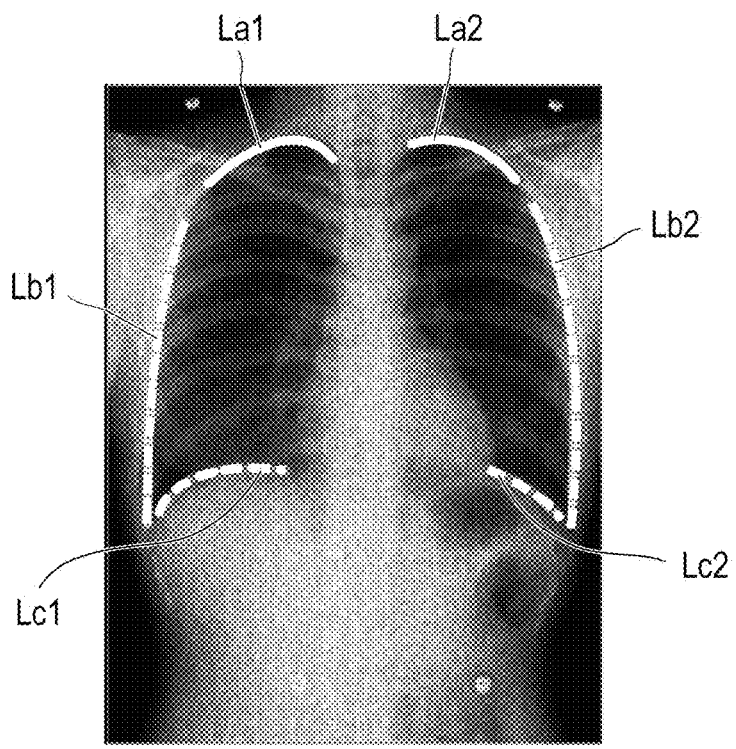
FIG. 4 is a view illustrating outer contours of regions of two lungs.

Next, the extended lung field region is extracted by connecting outer contours of the extracted contours (refer to FIG. 4).

FIG. 4 is a view illustrating the outer contours of the regions of the two lungs. As illustrated in FIG. 4, the outer contours of the regions of the two lungs are formed of contours La1 and La2 of pulmonary apices, contours Lb1 and Lb2 of boundaries with an outer thorax, and contours Lc1 and Lc2 of boundaries with the diaphragm. The outer contour may be considered as the contour of the lung other than the contour of the lung facing a region between the right and left lungs being an inner contour, for example.

For example, by connecting the contours La1 and La2 of the pulmonary apices of the right and left lungs by a straight line or a curved line and connecting the contours Lc1 and Lc2 of the boundaries with the diaphragm by a straight line or a curve line, the contour of the extended lung field region is generated, and the inside of the extracted contour is extracted as the extended lung field region. Meanwhile, when connecting the contours La1 and La2 of the pulmonary apices, tip ends of La1 and La2 may be connected by a straight line or a curved line, or highest points of La1 and La2 may be connected by a straight line or a curved line. When connecting the contours Lc1 and Lc2 of the boundaries with the diaphragm, tip ends (inner tip ends) of Lc1 and Lc2 are connected by a straight line or a curved line.

Alternatively, it is also possible to generate the contour of the extended lung field region by connecting the extracted contours La1 and La2 of the pulmonary apices of the right and left lungs by a straight line or a curved line and connecting the contours Lb1 and Lb2 of the boundaries with the outer thorax by a straight line or a curved line, and extract the inside of the generated contour as the extended lung field region. When connecting the contours La1 and La2 of the pulmonary apices, the tip ends of La1 and La2 may be connected by a straight line or a curved line, or the highest points of La1 and La2 may be connected by a straight line or a curved line. When connecting the contours Lb1 and Lb2 of the boundaries with the outer thorax, lower ends of Lb1 and Lb2 are connected by a straight line or a curved line.

Figure 5:
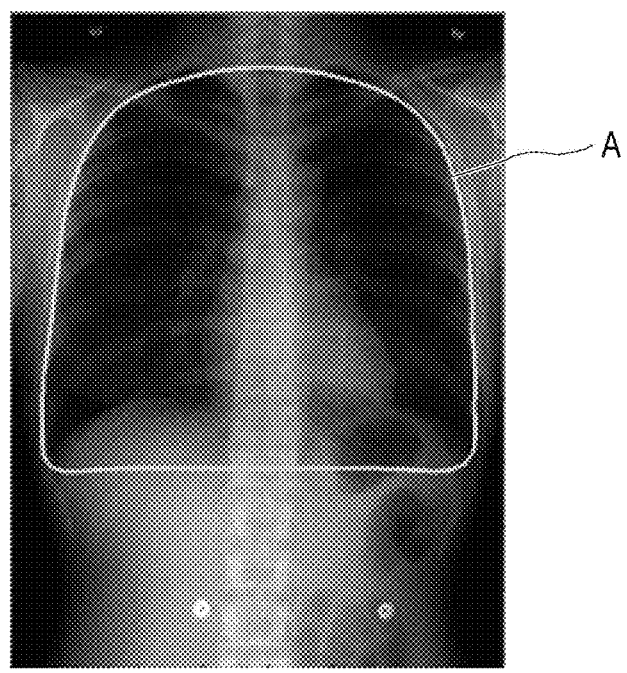
FIG. 5 is a view illustrating an example of an extended lung field region.

FIG. 5 is a view illustrating an example of an extended lung field region A extracted by connecting the extracted contours La1 and La2 of the right and left pulmonary apices by a straight line or a curved line and connecting the contours Lb1 and Lb2 of the boundaries with the outer thorax by a straight line or a curved line. In this manner, by connecting the contours Lb1 and Lb2 of the boundaries with the outer thorax by a straight line or a curved line, it becomes possible to include a lung field behind the diaphragm (the back side of the lung field) in the extended lung field region.

A type of the straight line or curved line with which the contours Lb1 and Lb2 of the boundaries with the outer thorax is connected may be determined on the basis of past data obtained experimentally and empirically. For example, in a plurality of past radiographic images (dynamic image or still image may be used), for example, a region where the lung exists is specified on the basis of an image obtained by photographing the side of the chest and the like, and an expression of the straight line or the curved line connecting the lower ends of the contours of the boundaries with the outer thorax so as to include the specified region is obtained to be stored in the storage 32 in association with a width of the thorax and/or subject attribute information such as sex, body height, body weight, and age. Then the expression corresponding to the width of the thorax in the dynamic image to be processed and/or the subject attribute information of the subject M is read out from the storage 32, and Lb1 and Lb2 are connected by applying the read expression. This makes it possible to include the lung field behind the diaphragm (back side of the lung field) more accurately in the extended lung field region.

Meanwhile, when positions of the pulmonary apices of the right and left lung regions (for example, the highest points of La1 and La2) are detected, and when the position of one pulmonary apex is lower than a predetermined threshold, it is possible that the position of the pulmonary apex (vertical position) is adjusted with reference to the position of the other pulmonary apex (La1 and La2 are adjusted), then La1 and La2 are connected and the extended lung field region is extracted.

Also, when positions of the boundaries of the right and left lung regions with the diaphragm (for example, positions of inner ends of Lc1 and Lc2) are detected, and when the position of the boundary of one lung with the diaphragm is higher than a predetermined threshold, it is possible that the position (vertical position) is adjusted with reference to the other position (Lc1 and Lc2 are adjusted), then Lc1 and Lc2 are connected and the extended lung field region is extracted.

Also, when positions of the boundaries of the right and left lung regions with the outer thorax (for example, positions of lower ends of Lb1 and Lb2) are detected, and when a distance between the position of the boundary of one lung with the outer thorax and the thoracic vertebra is shorter than a predetermined threshold, it is possible that the position is adjusted with reference to the other position (Lb1 and Lb2 are adjusted), then Lb1 and Lb2 are connected and the extended lung field region is extracted.

By these corrections, even if extraction of the contour of one of the right and left lung regions fails, it is possible to correct the failure from the information of the contour of the other lung.

(2) First, the pixel signal value of each pixel of the frame image to be processed in the dynamic image is binarized by a predetermined threshold to extract the right and left lung regions. Next, expansion processing and contraction processing are repeated for the extracted right and left lung regions to connect the right and left lung regions to generate the extended lung field region.

Meanwhile, it is preferable that the contour of the extended lung field region extracted at step S12 be smoothed. For example, smoothing is performed by sequentially correcting each pixel forming the contour of the extended lung field region by the least squares method and the like. This makes it possible to make the extended lung field region smooth and visible.

Next, the pulmonary function is analyzed in the dynamic image, and the analysis result image illustrating the analysis result of the pulmonary function for each pixel or each block of a plurality of pixels in the extended lung field region is generated (step S13).

Herein, when the lung expands due to a lung ventilation function and density of the lung decreases, the radiation transmission amount increases, so that the pixel signal value in the extended lung field region of the dynamic image increases. On the other land, when the lung contracts and the density of the lung increases, the radiation transmission amount decreases, so that the pixel signal value in the extended lung field region of the dynamic image decreases. Therefore, it is possible to analyze the lung ventilation function on the basis of change in pixel signal value in the extended lung field region of the dynamic image. Also, when a large amount of blood flows to the lung, the radiation transmission amount decreases, so that the pixel signal value in the extended lung field region of the dynamic image decreases. On the other hand, when the blood flow of the lung decreases, the radiation transmission amount increases, so that the pixel signal value in the extended lung field region of the dynamic image increases. Therefore, for example, a blood flow function of the lung may be analyzed on the basis of the change in pixel signal value in the extended lung field region of the dynamic image.

When the pulmonary function selected at step S11 is ventilation, the following ventilation analysis is performed at step S13.

First, low-pass filter processing in a time direction is applied to the dynamic image. Specifically, temporal change of the pixel signal value is obtained for each pixel of the dynamic image and filtered with a low-pass filter in the time direction (for example, with a cutoff frequency of 0.85 Hz). Next, for each pixel or each block of a plurality of pixels in each frame image of the dynamic image, a difference value (absolute value) of the pixel signal value (in a case of the block, a representative value (average value, median value, maximum value and the like) of the pixel signal values in the block) from a reference frame image (herein, the frame image of a maximal expiratory level) is calculated, and the analysis result image in which the pixel signal value of each pixel (or block) is the difference value from the pixel signal value of the pixel (or block) of the reference frame image is generated. When the extended lung field region is extracted from one frame image at step S12, the region in the same position (coordinates) as the extended lung field region extracted at step S12 is extracted as the extended lung field region of each frame image of the analysis result image, and as the pixel signal value of the region other than the extracted extended lung field region is removed or attenuated, the analysis result image of the ventilation in the extended lung field region is generated. When the extended lung field region is extracted from each frame image at step S12, the region in the same position (coordinates) as the extended lung field region extracted from the corresponding frame image at step S12 is extracted as the extended lung field region in each frame image of the analysis result image, and as the pixel signal value of the region other than the extracted extended lung field region is removed or attenuated, the analysis result image of the ventilation in the extended lung field region is generated.

Meanwhile, the frame image in which the area of the extended lung field region is the smallest may be set to the frame image of the maximum expiratory level. The area of the extended lung field region may be obtained from the number of pixels in the extended lung field region×the pixel size. Also, the frame image in which the position of the boundary with the diaphragm is the highest may be set to the frame image of the maximum expiratory level.

When the pulmonary function selected at step S1 is the blood flow, following blood flow analysis is performed at step S13.

First, high-pass filter processing in a time direction is applied to the dynamic image. Specifically, temporal change of the pixel signal value is obtained for each pixel of the dynamic image and filtered with a high-pass filter in the time direction (for example, with a cutoff frequency of 0.80 Hz). Next, for each pixel or each block of a plurality of pixels in each frame image of the dynamic image, a difference value (absolute value) of the pixel signal value (in a case of the block, a representative value (average value, median value, maximum value and the like) of the pixel signal values in the block) from a reference frame image (herein, the frame image in which an area of a cardiac region is the largest) is calculated, and the analysis result image in winch the pixel signal value of each pixel (or block) is the difference value from the pixel signal value of the pixel (or block) of the reference frame image is generated. When the extended lung field region is extracted from one frame image at step S12, the region in the same position (coordinates) as the extended lung field region extracted at step S12 is extracted as the extended lung field region of each frame image of the analysis result image, and as the pixel signal value of the region other than the extracted extended lung field region is removed or attenuated, the analysis result image of the blood flow in the extended lung field region is generated. When the extended lung field region is extracted from each frame image at step S12, the region in the same position (coordinates) as the extended lung field region extracted from the corresponding frame image at step S12 is extracted as the extended lung field region in each frame image of the analysis result image, and as the pixel signal value of the region other than the extracted extended lung field region is removed or attenuated, the analysis result image of the blood flow in the extended lung field region is generated.

Meanwhile, the area of the cardiac region may be obtained by extracting the cardiac region from the frame image using the well-known image processing technology disclosed in Japanese Patent No. 2796381 and the like and calculating the number of pixels of the extracted cardiac region×pixel size.

When the pulmonary function selected at step S11 is the blood flow, at step S13, the analysis result image may be generated using the method disclosed in JP 2012-239796 A.

First, a pulsation signal waveform from the start of photographing is obtained, a cross-correlation coefficient between the pulsation signal waveform and a blood flow signal waveform of each pixel or each block is calculated while shifting the blood flow signal waveform by one frame interval with respect to the pulsation signal waveform for each pixel or a block of a plurality of pixels (shifting in the time direction), and a dynamic image in which an image illustrating the cross-correlation coefficient calculated for each frame shift for each pixel or each block as one frame may be generated as the analysis result image of the blood flow. Then, the analysis result image of the blood flow in the extended lung field region may be generated as the pixel signal value of the region other than the extended lung field region in the analysis result image is removed or attenuated.

The blood flow signal waveform may be obtained by obtaining a waveform indicating temporal change of the pixel signal value of each pixel (representative value (average value, maximum value and the like) of the pixel signal values in a block in a case of the block) after applying the high-pass filter processing (for example, with low-pass cutoff frequency of 0.8 Hz) in the time direction to the temporal change of each pixel in a series of frame images.

As the pulsation signal waveform, any one of the following may be used.

(a) Waveform indicating temporal change of signal value in region of interest (ROI) defined in cardiac region (or aortic region)
(b) Signal waveform obtained by inverting waveform of (a)
(c) Electrocardiographic signal waveform obtained by cardiac potential detecting sensor
(d) Signal waveform indicating motion of heart wall (position change)

The cross-correlation coefficient may also be obtained by following [Expression 1]. Herein, an output signal waveform of the small region is intended to mean the blood flow signal waveform of the pixel or block.

$$C = \frac{1}{J}\sum_{j=1}^{J} \frac{\{A(j)-m_A\}\{B(j)-m_B\}}{\sigma_A \sigma_B} \quad \text{[Expression 1]}$$

$$m_A = \frac{1}{J}\sum_{j=1}^{J} A(j), \; m_B = \frac{1}{J}\sum_{j=1}^{J} B(j)$$

$$\sigma_A = \sqrt{\frac{1}{J}\sum_{j=1}^{J} \{A(j)-m_A\}^2}$$

$$\sigma_B = \sqrt{\frac{1}{J}\sum_{j=1}^{J} \{B(j)-m_B\}^2}$$

C: cross-correlation coefficient
A(j): jth signal value out of total of J signals included in pulsation signal waveform
$m_A$: average signal value of total signals included in pulsation signal waveform
$\sigma_A$: standard deviation of total signals included in pulsation signal waveform
B(j): jth signal value out of total of J signals included in output signal waveform of small region
$m_B$: average signal value of total signals included in output signal waveform of small region
$\sigma_B$: standard deviation of total signals included in output signal waveform of small region Meanwhile, in the description above, it is described that analysis is performed on the basis of a change in pixel signal value in an entire region of the dynamic image to generate the analysis result image for the entire dynamic image, and then the analysis result of the extended lung field region is extracted, thereby generating the analysis result image of the extended lung field region, but it is also possible to generate the analysis result image of the extended lung field region by applying the above-described processing to the extended lung field region extracted from the dynamic image in advance.

Next, the analysis result image of the extended lung field region is displayed on the display 34 (step S14).

For example, a color corresponding to the pixel signal value is added to the analysis result image of the extended lung field region generated at step S13, and this is displayed on the display 34 so as to be superimposed on the dynamic image.

FIG. 6 illustrates an analysis result image illustrating a result of ventilation analysis of the entire dynamic image, an analysis result image illustrating a result of ventilation analysis of the lung field region extracted by a conventional method, and an analysis result image illustrating a result of ventilation analysis of the extended lung field region extracted by the method of this embodiment. As illustrated in FIG. 6, in the analysis result image of the entire dynamic image, as indicated by an arrow, a signal indicating the ventilation function is obtained due to an influence of noise also in a region where the lung does not exist originally. In the analysis result image of the lung field region extracted by the conventional method, the signal indicating the ventilation function cannot be obtained for the region between the two lungs in front of the thoracic vertebra and at the back of the heart, and the lung existing at the back of the diaphragm. On the other hand, in the analysis result image of the extended lung field region extracted by the method of this embodiment, while the signal indicating the ventilation function for the region between the two lungs in front of the thoracic vertebra and at the back of the heart and the lung existing at the back of the diaphragm are completely obtained, the influence of noise is eliminated. In this manner, by the method of this embodiment, it is possible to obtain the information indicating the pulmonary function with a high degree of accuracy from the dynamic image of the chest.

Next, on the basis of the generated analysis result image, the quantitative information of the pulmonary function is calculated (step S15).

For example, when the pulmonary function selected at step S11 is the ventilation, at step S15, a vital capacity and/or FEV1.0% is calculated as the quantitative information of the ventilation function of the lung. When the pulmonary function selected at step S11 is the blood flow, at step S15, a volume of infusion (blood volume) is calculated as the quantitative information of the blood flow function of the lung.

The vital capacity may be obtained by following (Expression 1). Meanwhile, the frame image in (Expression 1) to (Expression 3) is intended to mean the frame image of the analysis result image.

Vital capacity=total value of pixel signal values in extended lung field region of frame image of maximum inspiration level×vital capacity coefficient (Expression 1)

The FEV1.0% may be obtained by following (Expression 2).

FEV1.0%=1−total value of pixel signal values in extended lung field region of frame image one second after start of expiration of dynamic image÷total value of pixel signal values in extended lung field region of frame image of maximum inspiration level    (Expression 2)

The volume of infusion may be obtained by following (Expression 3).

Volume of infusion=total value of pixel signal values in extended lung field region in frame image in which area of cardiac region is smallest×blood volume coefficient    (Expression 3)

Herein, the frame image in which the area of the heart is the smallest is the image in which the blood flow spreads throughout the lung field.

Meanwhile, the vital capacity coefficient and the blood volume coefficient are experimentally or empirically obtained in advance on the basis of the past data.

Meanwhile, in (Expression 1) to (Expression 3), the total value of the pixel signal values in the extended lung field region of a predetermined frame image of the analysis result image is calculated, and the quantitative information is obtained on the basis of the calculated total value; however, the present invention is not limited to this, and it is also possible that other statistical values such as an average value, a maximum value, a minimum value, and standard deviation are calculated, and the quantitative information is obtained on the basis of the calculated statistical values. The coefficients to be used differ depending on the statistical values used for the quantitative information.

In the analysis result image generated in this embodiment, as illustrated in FIG. 6, while the functional information regarding the region between the two lungs in front of the thoracic vertebra and at the back of the heart and the lung existing at the back of the diaphragm is completely included, the influence of the noise is eliminated, so that it is possible to calculate the quantitative information of the pulmonary function with a high degree of accuracy.

Next, the calculated quantitative information is displayed on the display 34 (step S16), and the dynamic analysis processing is terminated.

As described above, according to the dynamic analysis system 100, the controller 31 of the diagnostic console 3 extracts, from the dynamic image of the chest, the extended lung field region formed of one region including the two lungs and the region between the two lungs and generates the analysis result image indicating the analysis result of the pulmonary function in the extracted extended lung field region. Therefore, since the analysis result image including the function information regarding the region between the two lungs in front of the thoracic vertebra and at the back of the heart and the lung existing at the back of the diaphragm from which the influence of the noise is eliminated is generated, it becomes possible to obtain the information of the pulmonary function with a high degree of accuracy from the dynamic image of the chest.

Meanwhile, the description contents in the above-described embodiment are a preferable example of the present invention, and there is no limitation.

For example, as illustrated in FIG. 6, in the analysis result image of the ventilation function in the entire image of the chest, there is the influence of the noise below the left lung as indicated by an arrow, but the influence of the noise appears in a position away from the lung field in a limited manner, and it is possible to estimate a range of the extended lung field region from the analysis result image of the ventilation function in the entire chest image. Therefore, when extracting the extended lung field region, first, the controller 31 may generate the analysis result image of the ventilation in the entire image, and extract the extended lung field region from the dynamic image on the basis of the generated analysis result image of the ventilation.

Also, for example, in the description above, an example in which a hard disk, a semiconductor non-volatile memory and the like is used as a computer readable medium of the program according to the present invention is described, but the present invention is not limited to this example. As other computer readable medium, a portable recording medium such as a CD-ROM is applicable. A carrier wave (carrier wave) is also applied as a medium for providing data of a program according to the present invention via a communication line.

In addition, a detailed configuration and detailed operation of each device forming the dynamic analysis system may be appropriately changed without departing from the gist of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. A dynamic analysis system comprising:
a hardware processor that:
extracts an extended lung field region including a lung field behind a diaphragm, two lungs and a region between the two lungs from a dynamic image obtained by radiography of a dynamic state of a chest of a subject; and
analyzes the dynamic image to generate an analysis result, and extracts a region corresponding to the extended lung field region of one frame image extracted by the hardware processor from each frame image of the generated analysis result formed of a plurality of frame images, thereby generating an analysis result image illustrating the analysis result of a pulmonary function in the extended lung field region.

2. The dynamic analysis system according to claim 1, wherein the hardware processor
extracts the extended lung field region from each of a plurality of frame images of the dynamic image, and
analyzes the dynamic image to generate an analysis result image formed of a plurality of frame images corresponding to each frame image of the dynamic image, and extracts a region in the same position as the extended lung field region of a corresponding frame image extracted by the hardware processor from each frame image of the generated analysis result image, thereby generating an analysis result image illustrating the analysis result of the pulmonary function in the extended lung field region.

3. The dynamic analysis system according to claim 1, wherein the hardware processor extracts contours of right and left lung regions from a frame image from which the extended lung field region is to be extracted in the dynamic image, generates a contour of the extended lung field region by connecting outer contours of the extracted contours, and extracts the inside of the generated contour as the extended lung field region.

4. The dynamic analysis system according to claim 3, wherein the hardware processor connects contours of pulmonary apices of the right and left lung regions by a straight line or a curved line and connects the contours of boundaries with a diaphragm of the right and left lung regions by a straight line or a curved line, thereby generating the contour of the extended lung field region, and extracts the inside of the generated contour as the extended lung field region.

5. The dynamic analysis system according to claim 3, wherein the hardware processor connects contours of pulmonary apices of the right and left lung regions by a straight line or a curved line and connects lower ends of contours of boundaries with an outer thorax of the right and left lung regions by a straight line or a curved line, thereby generating the contour of the extended lung field region, and extracts the inside of the generated contour as the extended lung field region.

6. The dynamic analysis system according to claim 5, further comprising:
a storage that stores an expression of the straight line or the curved line for connecting the lower ends of the contours of the boundaries with the outer thorax experimentally or empirically obtained for a subject corresponding to a width of the thorax and/or subject attribute information in association with the width of the thorax and/or the subject attribute information,
wherein the hardware processor connects the lower ends of the contours of the boundaries with the outer thorax of the right and left lung regions by the straight line or the curved line using the expression of the straight line or the curved line stored in the storage.

7. The dynamic analysis system according to claim 3, wherein the hardware processor detects vertical positions of pulmonary apices of the right and left lung regions, and when a position of one pulmonary apex is lower than a predetermined threshold, adjusts the position of the pulmonary apex with reference to the position of the other pulmonary apex, and then extracts the contours of the right and left lung regions.

8. The dynamic analysis system according to claim 3, wherein the hardware processor detects vertical positions of boundaries with a diaphragm of the right and left lung regions, and when a position of a boundary with the diaphragm of one lung is higher than a predetermined threshold, adjusts the position with reference to the position of the other lung, and then extracts the contours of the right and left lung regions.

9. The dynamic analysis system according to claim 3, wherein the hardware processor detects positions of boundaries with an outer thorax of the right and left lung regions, and when a distance between a position of a boundary with the outer thorax of one lung and a thoracic vertebra is shorter than a predetermined threshold, adjusts the position with reference to the position of the other lung, and then extracts the contours of the right and left lung regions.

10. The dynamic analysis system according to claim 1, wherein the hardware processor binarizes a pixel signal value of each pixel of a frame image from which the extended lung field region is to be extracted in the dynamic image by a predetermined threshold to extract right and left lung regions, and extracts the extended lung field region by repeating expansion processing and contraction processing on the extracted right and left lung regions to connect the right and left lung regions.

11. The dynamic analysis system according to claim 1, wherein the hardware processor generates an analysis result image illustrating an analysis result regarding a ventilation function of the dynamic image and extracts the extended lung field region on the basis of the generated analysis result image.

12. The dynamic analysis system according to claim 1, wherein the hardware processor performs a smoothing process on a contour of the extracted extended lung field region.

13. The dynamic analysis system according to claim 1, further comprising:
a display that displays the analysis result image of the extended lung field region generated by the hardware processor so as to be superimposed on the dynamic image.

14. The dynamic analysis system according to claim 1, wherein the hardware processor calculates quantitative information of the pulmonary function of the subject on the basis of the analysis result image generated by the hardware processor.

15. The dynamic analysis system according to claim 14, wherein the hardware processor calculates a statistical value of a pixel signal value of the extended lung field region in the analysis result image generated by the hardware processor and calculates quantitative information of the pulmonary function of the subject on the basis of the calculated statistical value.

16. The dynamic analysis system according to claim 1, wherein the pulmonary function is a ventilation function.

17. The dynamic analysis system according to claim 1, wherein the pulmonary function is a blood flow function.

18. The dynamic analysis system according to claim 1, wherein the extended lung field region is one region.

19. The dynamic analysis system according to claim 1, wherein the analysis result is generated by analyzing an entire region of the dynamic image.

20. The dynamic analysis system according to claim 1, wherein the analysis result is generated by analyzing the extended lung field region of the dynamic image.

21. A non-transitory computer readable medium (CRM) storing a program causing a computer to execute a process, the process comprising:
extracting an extended lung field region including a lung field behind a diaphragm, two lungs and a region between the two lungs from a dynamic image obtained by radiography of a dynamic state of a chest of a subject; and
analyzing the dynamic image to generate an analysis result, and extracting a region corresponding to the extended lung field region of one frame image extracted by the hardware processor from each frame image of the generated analysis result formed of a plurality of frame images, thereby generating an analysis result image illustrating the analysis result of a pulmonary function in the extended lung field region.

22. A non-transitory computer readable medium (CRM) according to claim 21, wherein the analysis result is generated by analyzing an entire region of the dynamic image.

23. A non-transitory computer readable medium (CRM) according to claim 21, wherein the analysis result is generated by analyzing the extended lung field region of the dynamic image.

24. A dynamic analysis device comprising:
a hardware processor that:
extracts an extended lung field region for analysis of a pulmonary function including a lung field behind a diaphragm, two lungs and a region between the two lungs from a dynamic image obtained by radiography of a dynamic state of a chest of a subject; and analyzes the dynamic image to generate an analysis result, and extracts a region corresponding to the extended lung field region of one frame image extracted by the hardware processor from each frame image of the generated analysis result formed of a plurality of frame images, thereby generating an analysis result image illustrating the analysis result of a pulmonary function in the extended lung field region.

25. A dynamic analysis system comprising:

a hardware processor that:

extracts an extended lung field region including a lung field behind a diaphragm, two lungs and a region between the two lungs from each of a plurality of frame images obtained by radiography of a dynamic state of a chest of a subject; and analyzes the dynamic image to generate an analysis result formed of a plurality of frame images, and extracts each region corresponding to each of the extended lung field region of each frame image extracted by the hardware processor from each frame image of the generated analysis result image, thereby generating an analysis result image illustrating the analysis result of a pulmonary function in each of the extended lung field region.

* * * * *